July 31, 1928.  
L. NEWMAN  
1,679,050  
SPRING SUSPENSION FOR MOTOR VEHICLES  
Filed Feb. 16, 1927   2 Sheets-Sheet 1
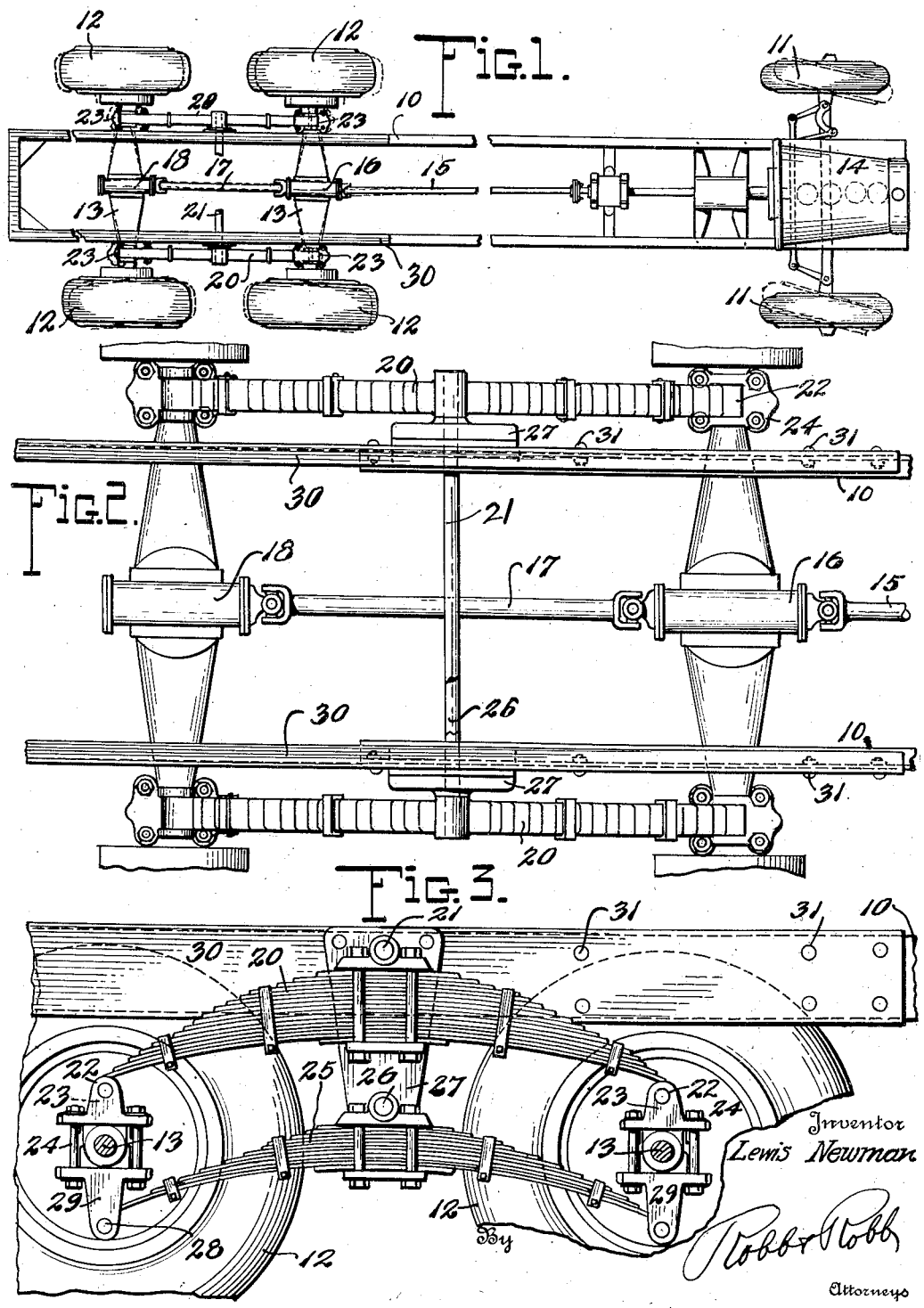

July 31, 1928.
L. NEWMAN
1,679,050
SPRING SUSPENSION FOR MOTOR VEHICLES
Filed Feb. 16, 1927　　2 Sheets-Sheet 2
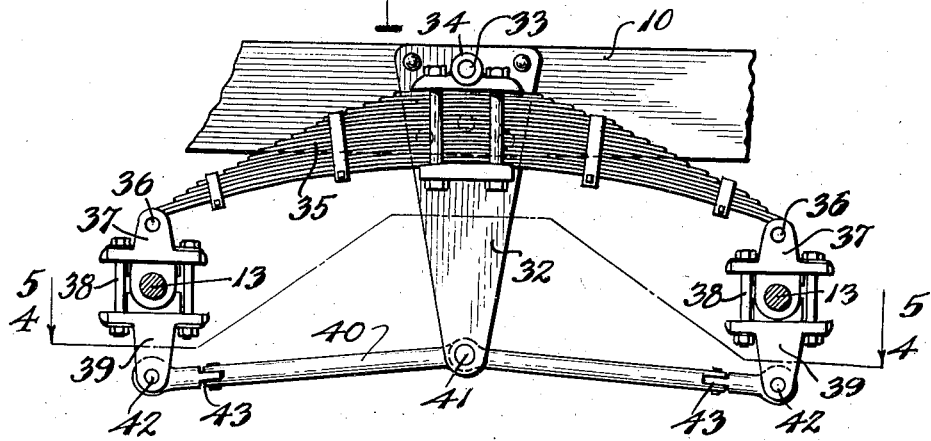
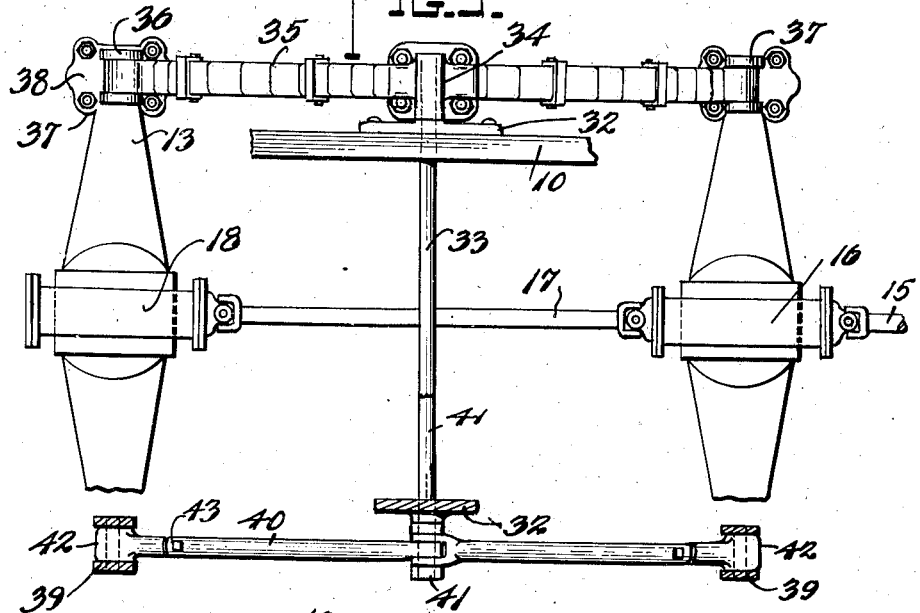
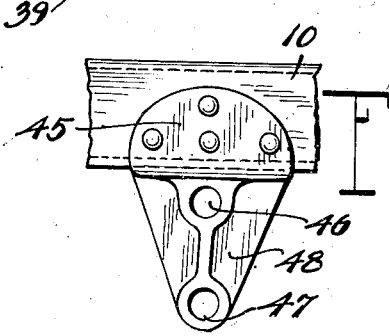
Inventor
Lewis Newman
By Robb & Robb
Attorneys Patented July 31, 1928.

1,679,050

UNITED STATES PATENT OFFICE.

LEWIS NEWMAN, OF CLEVELAND, OHIO.

SPRING SUSPENSION FOR MOTOR VEHICLES.

Application filed February 16, 1927. Serial No. 168,593.

This invention relates to a spring suspension, and particularly to a construction in which the dual axles used in trucks are connected by longitudinally disposed springs which in their expansion shift the axles in a horizontal plane.

The invention is designed for application to trucks of unusual weight and length which utilize parallel driving or rear axles and involve material strain and resistance in negotiating road curves. Unless the parallel axles are free to move in a slight arc upon a horizontal plane, a sliding or slipping movement bodily is liable to occur. In turning a curve the inertia or centrifugal force at the outside of the vehicle tends to throw the load toward that side and applies a supplemental pressure to the springs there disposed, causing them to elongate and moving the wheels in a horizontal plane away from each other while the inner spring being relieved of the weight has a tendency to permit a movement of the axles toward each other at the side of the vehicle next the axis of the curve. The objections noted are thus obviated and an equalized spring suspension secured by a horizontal pivotal mounting of the spring upon the chassis and the pivotal connections of the ends of the spring at the axle bearings.

This mounting also permits an equalizing of the movements of the axle bearings if one wheel is raised vertically, for instance as when in contact with an obstruction upon the road. Under ordinary conditions the expansion of such a spring suspension tends to cause a vertical plane rotative shifting of the bearing upon the axle and to correct such tendency two springs or yielding members are pivoted upon the frame of the vehicle and further pivoted to the axle bearings at points spaced above and below the same, which results in equal movements in parallel planes of the bearings incident to the transverse shifting of the axle.

The invention has for an object to provide a novel and improved construction including an equalizing spring suspension in which a spring member is pivoted centrally upon the vehicle frame and pivotally connected at its opposite ends to parallel axles.

A further object of the invention is to provide a spring suspension in which the spring is connected to the axle bearing at one side thereof in connection with a pivoted connector expandable longitudinally with respect to the frame and connected with the axle bearing at a point opposite the spring connection so as to effect a movement in parallelism at each side of the bearing upon compression of the spring.

Another object of the invention is to provide a unit construction comprising a frame provided with opposite spring members connected at their ends with parallel axles and pivotally mounted upon the frame to secure a transverse movement of such axles.

Another object of the invention is to provide a structure including parallel leaf springs on the same side of the vehicle each pivotally mounted upon a support and connected at their outer ends with dual axles having boxes provided with oppositely extended lugs disposed in a vertical plane for that purpose, whereby the expansion of the spring under compression is transferred to the axle at opposite sides thereof.

Other and further objects and advantages of the invention will be hereinafter set forth and the novel features thereof defined by the appended claims.

In the accompanying drawings:

Figure 1 is a plan of a truck having the invention applied thereto;

Figure 2 is a similar view upon an enlarged scale of the dual axles;

Figure 3 is a detail side elevation of Figure 2;

Figure 4 is a modified form of the spring connection;

Figure 5 is a plan of Figure 4 with the lower portion in section upon the line 5—5 of Figure 4; and Figure 6 is a detail elevation of a modified form of supporting bracket.

Like reference characters designate corresponding parts throughout the several figures of the drawing.

The invention is designed particularly for application to heavy trucks which require the use of dual driving or rear axles, but the construction and arrangement of the truck may be varied at will and is merely conventionally indicated at 10 in the drawings. It is there provided with the usual front or steering wheels 11 and the rear traction wheels 12, these being mounted upon parallel axles 13. The truck is provided with any preferred form of motor or engine 14 from which the transmission shaft 15 extends to a proper driving connection upon the forward rear axle as indicated at 16 and power is conveyed therefrom by a universal coupling 17 to the rear axle drive 18.

The spring supporting means are shown in Figure 3 as comprising an upper leaf spring 20 pivotally mounted upon the chassis of the machine at 21 and pivotally connected at its outer ends 22 with a vertical lug or post 23 carried by the bearing box 24 for the axles 13. Beneath the spring 20 a supplemental spring 25 is mounted upon a bearing 26 extending from a bracket 27 depending from the machine frame, and the outer ends of the spring 25 are pivoted at 28 to the depending lugs or posts 29 from the bearing box 24, such lugs being disposed in vertical alignment with the lugs 22 and spaced at opposite sides of the axle 13.

The result of such a mounting is that the springs in their expansion on the application of weight apply the power equally above and below the axle to effect a lateral movement at one end thereof in parallel planes so as to prevent a torsional or turning movement of the axle bearing. The result of such movement incident to the shifting of the load weight in turning a curve causes the outer wheels 12 of the truck, as shown in Figure 1, to move away from each other increasing the distance between the same while the inner or opposite wheels 12 are moved toward each other as the relief of the weight from the inner spring permits such movement. This results in a proper tracking of the wheels in an arc as they traverse a short curve and prevents the bodily skidding or slipping of the rear end of the truck when traversing such a section of road.

It is also obvious that in this arrangement any vertical movement of either of the wheels is equalized by the parallel springs so as not to affect the remaining wheels and the bodily pivoting of the supporting springs upon the frame provide for such a rocking movement in a vertical plane.

In the application of this invention it is found desirable to construct the same as a unit applicable to the chassis of present truck constructions and for that purpose the axles and springs are mounted upon a frame member 30 which may be applied and secured by devices such as indicated at 31 to the chassis side members 10 so as to provide for the use of the present invention by the simple removal of the rear axles and the driving connections from the ordinary truck.

While the invention has been described in connection with Figure 3 as comprising two spring members pivotally mounted upon the chassis and connected to the axles, it is obvious that a similar function can be secured if the load weight to be carried does not require more than a single spring. In such instance a construction as shown in Figures 4 and 5 may be used where the frame 10 is provided with a depending bracket 32 carrying a pivot 33 at its upper portion for the pivoting sleeve 34 secured to the center of the spring 35 while the outer ends of the spring are pivoted at 36 to the vertical lugs or posts 37 from the bearing box 38 for the axles 13. The lugs or post 39 at the opposite side of the bearing box are in alignment with the posts 37 but are pivotally connected with the bracket 32 by torque rods 40, these having a pivotal connection 41 at the lower portion of the bracket and a similar connection 42 with the post 39. These torque rods are also provided with lateral joints, as indicated at 43, which provide against torsional strain or twisting movement.

It will be understood that the springs 35 and torque rods 40 are duplicated at opposite sides of the vehicle as indicated by the upper and lower portions of Figure 5. In the forms of the invention shown in Figures 3 and 4 the pivot for the upper spring is disposed at one side of the chassis or side frame members but it may be located in a lower position and the pivot for the lower connection correspondingly disposed. For such a purpose a form of bracket is shown by detail in Figure 6 having its upper plate 45 bolted to the frame 10 and being provided with the pivotal centers 46 and 47 disposed in vertical alignment but in different horizontal planes upon the depending portion 48 of the bracket.

The operation of the invention will be apparent from the foregoing description from which it will be seen that it embodies a simple structure having a pivotal mounting upon the vehicle frame for oscillation in a vertical plane and also pivotally connected to the parallel or dual axles so as to provide for an equalized movement in the shifting thereof incident to the centrifugal action of traversing a road curve.

While the details of the invention have been specifically shown and described, it is not confined thereto as changes and alterations may be made in the character of connections between the vehicle frame and the parallel axles without departing from the spirit of the invention as defined by the following claims.

Having thus described my invention, what I claim as new and desire to secure by Letters Patent of the United States, is:—

1. A spring suspension including a supporting frame, a spring member pivoted thereon for movement in a vertical plane, and dual axles pivotally connected at the free ends of said spring and both being free for transverse movement toward and from each other caused by expansion of said spring.

2. A spring suspension including a supporting frame, a spring member pivoted thereon for movement in a vertical plane, dual axles pivotally connected at the free ends of said spring and free for transverse movement toward and from each other incident to expansion of said spring, and a connection pivotally mounted beneath the spring pivot and pivotally connected at its outer ends to the bearing boxes for said axles at a point removed from the spring pivots.

3. A spring suspension including a supporting frame, a spring member pivoted thereon for movement in a vertical plane, dual axles pivotally connected at the free ends of said spring and free for transverse movement toward and from each other incident to expansion of said spring, and a supplemental spring pivoted in the vertical plane of the pivot of the first mentioned spring and having its outer ends pivotally connected to said axles at a point below the pivotal connection of the first mentioned spring.

4. A spring suspension including a frame, a supporting spring pivotally connected with the frame for movement in a vertical plane, parallel axles provided with bearing boxes having pivoting posts at the upper and lower faces thereof, a pivotal connection between the upper post and said spring, and a connecting member pivoted in alignment with said spring and having a pivotal connection with the lower post of the bearing box.

5. A spring suspension unit including a frame member adapted for application to a vehicle frame, a spring having a horizontal pivot upon said member, dual axles provided with boxes formed with oppositely extending posts, a pivotal connection between the upper post and said spring ends, and means connecting the lower posts to effect a movement in parallelism at each side above and below the axles.

6. A spring suspension unit including a frame member adapted for application to a vehicle frame, a spring having a horizontal pivot upon said member, dual axles provided with boxes formed with oppositely extending posts, a pivotal connection between the upper post and said spring ends, a depending bracket from said frame, a supplemental spring pivoted upon said bracket in alignment with the first spring, and a pivotal connection between the ends of the supplemental spring and the depending posts.

7. A spring suspension including a frame, parallel springs pivotally mounted at opposite sides thereon for vertical movement on the frame, a connecting member pivoted beneath the spring pivot, and dual axles connected to said spring and connecting member and free for transverse movement in different directions at the opposite sides of the vehicle frame.

In testimony whereof I affix my signature.

LEWIS NEWMAN.